(12) United States Patent
Wuollet et al.

(10) Patent No.: US 12,391,199 B2
(45) Date of Patent: Aug. 19, 2025

(54) UTILITY VEHICLE FLUID CONTAINMENT SYSTEM

(71) Applicant: Polaris Industries Inc., Medina, MN (US)

(72) Inventors: Pekka Wuollet, East Bethel, MN (US); Jared M. Albers, St. Croix Falls, WI (US); William R. Shaw, Blaine, MN (US)

(73) Assignee: Polaris Industries Inc., Medina, MN (US)

( * ) Notice: Subject to any disclaimer, the term of this patent is extended or adjusted under 35 U.S.C. 154(b) by 243 days.

(21) Appl. No.: 17/985,511

(22) Filed: Nov. 11, 2022

(65) Prior Publication Data

US 2024/0157898 A1 May 16, 2024

(51) Int. Cl.
 *B60R 16/00* (2006.01)
 *B60R 13/06* (2006.01)
 *B60R 16/08* (2006.01)
 *B62D 33/023* (2006.01)

(52) U.S. Cl.
 CPC .............. *B60R 16/08* (2013.01); *B60R 13/06* (2013.01); *B62D 33/023* (2013.01)

(58) Field of Classification Search
 CPC ......... B60J 10/00; B60J 7/0084; B60R 13/06; B60R 13/07; B60R 5/04; B60R 9/065; B60R 2021/134; B62D 25/24; B62D 33/027; B62D 33/03; B62D 33/02; B62D 25/2054
 USPC ........................................ 296/208, 213, 37.6
 See application file for complete search history.

(56) References Cited

U.S. PATENT DOCUMENTS

| | | | |
|---|---|---|---|
| 2,762,090 A | * | 9/1956 | Spraragen ............... B60R 13/06 49/500.1 |
| 3,007,726 A | | 11/1961 | Parkin |
| 3,600,768 A | | 8/1971 | Romanzi et al. |
| 3,734,219 A | | 5/1973 | Christensen et al. |

(Continued)

FOREIGN PATENT DOCUMENTS

| | | |
|---|---|---|
| CA | 2433019 A1 | 5/2003 |
| CA | 2903511 A1 | 12/2016 |

(Continued)

OTHER PUBLICATIONS

"2020 Polaris RZR—Is this the Real Deal?" Jul. 16, 2019. Youtube. https://www.youtube.com/watch?v=8J7uX6Y4UOc.

(Continued)

*Primary Examiner* — Steven O Douglas
(74) *Attorney, Agent, or Firm* — Merchant & Gould P.C.

(57) ABSTRACT

A vehicle includes a plurality of ground engaging members and a frame supported by the ground engaging members. A powertrain and a utility or cargo bed are supported by the frame. The cargo bed comprises a first wall extending generally longitudinally and a second wall extending generally longitudinally, and the second wall is laterally spaced from the first wall. The cargo bed further comprises a bed floor extending between the first wall and the second wall and a tailgate. The vehicle further comprises a drain coupled to a rearward portion of the utility bed and the drain is configured to direct fluid from the bed floor to a position rearward of the bed floor and away from at least a portion of the powertrain.

20 Claims, 9 Drawing Sheets

(56) References Cited

U.S. PATENT DOCUMENTS

| | | | |
|---|---|---|---|
| 4,188,058 A * | 2/1980 | Resa | B60R 13/01 |
| | | | 296/39.2 |
| 4,217,970 A | 8/1980 | Chika | |
| 4,429,588 A | 2/1984 | Emundts et al. | |
| 4,561,323 A | 12/1985 | Stromberg | |
| 4,577,716 A | 3/1986 | Norton | |
| 4,807,921 A * | 2/1989 | Champie, III | B60J 7/068 |
| | | | 296/100.09 |
| 4,934,737 A | 6/1990 | Nakatsuka | |
| 4,967,944 A | 11/1990 | Waters | |
| 5,010,970 A | 4/1991 | Yamamoto | |
| 5,020,616 A | 6/1991 | Yagi et al. | |
| 5,021,721 A | 6/1991 | Oshita et al. | |
| 5,027,915 A | 7/1991 | Suzuki et al. | |
| 5,076,383 A | 12/1991 | Inoue et al. | |
| 5,078,225 A | 1/1992 | Ohmura et al. | |
| 5,083,827 A | 1/1992 | Hollenbaugh, Sr. | |
| 5,167,433 A | 12/1992 | Ryan | |
| 5,201,562 A | 4/1993 | Dorsey | |
| 5,205,371 A | 4/1993 | Karnopp | |
| 5,251,713 A | 10/1993 | Enokimoto | |
| 5,253,730 A | 10/1993 | Hayashi et al. | |
| 5,306,044 A | 4/1994 | Tucker | |
| 5,327,989 A | 7/1994 | Furuhashi et al. | |
| 5,440,998 A * | 8/1995 | Morgan, IV | B65D 19/0048 |
| | | | 108/901 |
| 5,473,990 A | 12/1995 | Anderson et al. | |
| 5,562,066 A | 10/1996 | Gere et al. | |
| 5,653,304 A | 8/1997 | Renfroe | |
| 5,772,276 A * | 6/1998 | Fetz | B62D 25/2054 |
| | | | 296/181.6 |
| 5,865,498 A | 2/1999 | Grogan | |
| 5,887,671 A | 3/1999 | Yuki et al. | |
| 5,921,343 A | 7/1999 | Yamakaji | |
| 6,067,078 A | 5/2000 | Hartman | |
| 6,086,158 A | 7/2000 | Zeoli | |
| 6,128,815 A * | 10/2000 | Jurica | B62D 65/02 |
| | | | 296/184.1 |
| 6,186,547 B1 | 2/2001 | Skabrond et al. | |
| 6,293,588 B1 | 9/2001 | Clune | |
| 6,309,024 B1 | 10/2001 | Busch | |
| 6,328,364 B1 | 12/2001 | Darbishire | |
| 6,347,454 B1 * | 2/2002 | Jurica | B62D 25/2054 |
| | | | 72/379.6 |
| 6,467,787 B1 | 10/2002 | Marsh | |
| 6,502,886 B1 | 1/2003 | Bleau et al. | |
| 6,523,634 B1 | 2/2003 | Gagnon et al. | |
| 6,582,012 B1 * | 6/2003 | Smith | B62D 47/003 |
| | | | 296/26.11 |
| 6,626,260 B2 | 9/2003 | Gagnon et al. | |
| 6,644,709 B2 | 11/2003 | Inagaki et al. | |
| 6,682,118 B2 | 1/2004 | Ryan | |
| 6,732,830 B2 | 5/2004 | Gagnon et al. | |
| 6,733,060 B1 | 5/2004 | Pavkov et al. | |
| 6,767,022 B1 | 7/2004 | Chevalier | |
| 6,799,779 B2 | 10/2004 | Shibayama | |
| 6,857,498 B2 | 2/2005 | Vitale et al. | |
| 6,880,875 B2 * | 4/2005 | McClure | B62D 43/10 |
| | | | 224/42.2 |
| 6,883,851 B2 * | 4/2005 | McClure | B62D 33/02 |
| | | | 224/42.2 |
| 6,895,318 B1 | 5/2005 | Barton et al. | |
| 6,966,399 B2 | 11/2005 | Tanigaki et al. | |
| 7,000,931 B1 | 2/2006 | Chevalier | |
| 7,077,233 B2 | 7/2006 | Hasegawa | |
| 7,096,988 B2 | 8/2006 | Moriyama | |
| 7,118,151 B2 * | 10/2006 | Bejin | B60R 5/04 |
| | | | 296/37.6 |
| 7,156,439 B2 | 1/2007 | Bejin et al. | |
| 7,182,169 B2 | 2/2007 | Suzuki | |
| 7,185,732 B2 | 3/2007 | Saito et al. | |
| 7,216,733 B2 | 5/2007 | Iwami et al. | |
| 7,234,707 B2 | 6/2007 | Green et al. | |
| 7,344,156 B2 | 3/2008 | Suzuki et al. | |
| 7,357,211 B2 | 4/2008 | Inui | |
| 7,370,724 B2 | 5/2008 | Saito et al. | |
| 7,374,012 B2 | 5/2008 | Inui et al. | |
| 7,374,234 B2 * | 5/2008 | Deschatres | B60J 10/90 |
| | | | 296/213 |
| 7,380,622 B2 | 6/2008 | Shimizu | |
| 7,407,190 B2 | 8/2008 | Berg et al. | |
| 7,458,593 B2 | 12/2008 | Saito et al. | |
| 7,481,293 B2 | 1/2009 | Ogawa et al. | |
| 7,490,694 B1 | 2/2009 | Berg et al. | |
| 7,497,299 B2 | 3/2009 | Kobayashi | |
| 7,497,471 B2 | 3/2009 | Kobayashi | |
| 7,497,472 B2 | 3/2009 | Cymbal et al. | |
| 7,503,610 B2 | 3/2009 | Karagitz et al. | |
| 7,540,511 B2 | 6/2009 | Saito et al. | |
| 7,565,944 B2 | 7/2009 | Sakamoto et al. | |
| 7,565,945 B2 | 7/2009 | Okada et al. | |
| 7,600,603 B2 | 10/2009 | Okada et al. | |
| 7,604,084 B2 | 10/2009 | Okada et al. | |
| 7,610,132 B2 | 10/2009 | Yanai et al. | |
| 7,625,048 B2 | 12/2009 | Rouhana et al. | |
| 7,630,807 B2 | 12/2009 | Yoshimura et al. | |
| 7,740,103 B2 | 6/2010 | Sasajima | |
| 7,786,886 B2 | 8/2010 | Maruyama et al. | |
| 7,819,220 B2 | 10/2010 | Sunsdahl et al. | |
| 7,832,770 B2 | 11/2010 | Bradley et al. | |
| D633,006 S | 2/2011 | Sanschagrin et al. | |
| 7,950,486 B2 * | 5/2011 | Van Bronkhorst | B60G 17/021 |
| | | | 180/89.11 |
| 7,954,679 B2 | 6/2011 | Edwards | |
| 8,027,775 B2 | 9/2011 | Takenaka et al. | |
| 8,056,966 B2 * | 11/2011 | Edwards | B60R 5/04 |
| | | | 296/37.6 |
| 8,079,602 B2 * | 12/2011 | Kinsman | B62D 21/14 |
| | | | 280/5.512 |
| 8,104,524 B2 | 1/2012 | Manesh et al. | |
| 8,123,283 B2 * | 2/2012 | Edwards | B60R 9/00 |
| | | | 296/183.1 |
| 8,176,957 B2 | 5/2012 | Manesh et al. | |
| 8,215,694 B2 | 7/2012 | Smith et al. | |
| 8,231,164 B2 | 7/2012 | Schubring et al. | |
| 8,271,175 B2 | 9/2012 | Takenaka et al. | |
| 8,302,711 B2 | 11/2012 | Kinsman et al. | |
| 8,328,235 B2 | 12/2012 | Schneider et al. | |
| 8,382,125 B2 | 2/2013 | Sunsdahl et al. | |
| 8,464,824 B1 | 6/2013 | Reisenberger | |
| 8,465,050 B1 | 6/2013 | Spindler et al. | |
| 8,538,628 B2 | 9/2013 | Backman | |
| 8,548,710 B1 | 10/2013 | Reisenberger | |
| 8,596,405 B2 | 12/2013 | Sunsdahl et al. | |
| 8,613,335 B2 | 12/2013 | Deckard et al. | |
| 8,613,337 B2 | 12/2013 | Kinsman et al. | |
| 8,640,814 B2 | 2/2014 | Deckard et al. | |
| 8,668,246 B2 * | 3/2014 | Gagnon | B62D 33/02 |
| | | | 296/183.1 |
| 8,781,705 B1 | 7/2014 | Reisenberger | |
| D711,778 S | 8/2014 | Chun et al. | |
| D712,309 S | 9/2014 | Wu et al. | |
| 8,827,025 B2 | 9/2014 | Hapka | |
| 8,827,028 B2 * | 9/2014 | Sunsdahl | B62D 21/183 |
| 8,997,908 B2 | 4/2015 | Kinsman et al. | |
| 8,998,253 B2 | 4/2015 | Novotny et al. | |
| 9,010,768 B2 | 4/2015 | Kinsman et al. | |
| D730,239 S | 5/2015 | Gonzalez | |
| 9,102,287 B1 * | 8/2015 | Courtright | B62D 29/008 |
| 9,150,182 B1 * | 10/2015 | Schlangen | B60G 3/20 |
| D756,845 S | 5/2016 | Flores | |
| D764,974 S | 8/2016 | Mikhailov et al. | |
| 9,434,244 B2 | 9/2016 | Sunsdahl et al. | |
| 9,440,671 B2 | 9/2016 | Schlangen et al. | |
| 9,469,329 B1 | 10/2016 | Leanza | |
| D772,755 S | 11/2016 | Tandrup et al. | |
| 9,540,052 B2 | 1/2017 | Burt, II et al. | |
| 9,555,702 B2 * | 1/2017 | Olli | B62D 61/10 |
| 9,573,561 B2 | 2/2017 | Muto et al. | |
| D780,627 S | 3/2017 | Jhant et al. | |
| 9,592,713 B2 | 3/2017 | Kinsman et al. | |
| D784,200 S | 4/2017 | Dunshee et al. | |
| 9,623,912 B2 | 4/2017 | Schlangen | |

(56) References Cited

U.S. PATENT DOCUMENTS

| | | | |
|---|---|---|---|
| D785,502 S | 5/2017 | Dunshee et al. | |
| 9,649,928 B2 | 5/2017 | Danielson et al. | |
| 9,713,976 B2 | 7/2017 | Miller et al. | |
| 9,725,023 B2 | 8/2017 | Miller et al. | |
| 9,776,481 B2 | 10/2017 | Deckard et al. | |
| 9,783,245 B1* | 10/2017 | Marchlewski | B62D 27/026 |
| 9,789,909 B2 | 10/2017 | Erspamer et al. | |
| 9,809,102 B2 | 11/2017 | Sunsdahl et al. | |
| 9,895,946 B2 | 2/2018 | Schlangen et al. | |
| 9,994,130 B2 | 6/2018 | Michels et al. | |
| 10,011,189 B2 | 7/2018 | Sunsdahl et al. | |
| 10,017,090 B2 | 7/2018 | Franker et al. | |
| 10,112,555 B2 | 10/2018 | Aguilera et al. | |
| 10,124,709 B2 | 11/2018 | Bohnsack et al. | |
| 10,154,377 B2 | 12/2018 | Post et al. | |
| 10,183,596 B2 | 1/2019 | Watanabe et al. | |
| 10,183,605 B2 | 1/2019 | Weber et al. | |
| 10,246,153 B2 | 4/2019 | Deckard et al. | |
| 10,369,861 B2 | 8/2019 | Deckard et al. | |
| 10,399,401 B2 | 9/2019 | Schlangen et al. | |
| 10,479,290 B2* | 11/2019 | Simard | B60R 11/06 |
| 10,486,748 B2 | 11/2019 | Deckard et al. | |
| 10,526,079 B1 | 1/2020 | Reichert | |
| 10,596,924 B2 | 3/2020 | Sprenger | |
| D890,026 S | 7/2020 | Nightingale et al. | |
| 10,864,828 B2 | 12/2020 | Sunsdahl et al. | |
| D906,888 S | 1/2021 | Satulovsky | |
| 10,926,618 B2 | 2/2021 | Deckard et al. | |
| 10,926,664 B2 | 2/2021 | Sunsdahl et al. | |
| 10,960,941 B2 | 3/2021 | Endrizzi | |
| 11,299,071 B2 | 4/2022 | Gropp et al. | |
| 11,572,110 B2 | 2/2023 | Levin et al. | |
| 2001/0021887 A1 | 9/2001 | Obradovich et al. | |
| 2001/0035642 A1 | 11/2001 | Gotz et al. | |
| 2001/0041126 A1 | 11/2001 | Morin et al. | |
| 2002/0082752 A1 | 6/2002 | Obradovich | |
| 2002/0135175 A1 | 9/2002 | Schroth | |
| 2002/0172574 A1 | 11/2002 | McCormack et al. | |
| 2003/0015531 A1 | 1/2003 | Choi | |
| 2003/0057724 A1 | 3/2003 | Inagaki et al. | |
| 2003/0132075 A1 | 7/2003 | Drivers | |
| 2003/0205867 A1 | 11/2003 | Coelingh et al. | |
| 2004/0010383 A1 | 1/2004 | Lu et al. | |
| 2004/0041358 A1 | 3/2004 | Hrovat et al. | |
| 2004/0066091 A1 | 4/2004 | King | |
| 2004/0079561 A1 | 4/2004 | Ozawa et al. | |
| 2004/0107591 A1 | 6/2004 | Cuddy | |
| 2004/0108159 A1 | 6/2004 | Rondeau et al. | |
| 2004/0169347 A1 | 9/2004 | Seki | |
| 2004/0195019 A1 | 10/2004 | Kato et al. | |
| 2004/0221669 A1 | 11/2004 | Shimizu et al. | |
| 2004/0226384 A1 | 11/2004 | Shimizu et al. | |
| 2004/0231900 A1 | 11/2004 | Tanaka et al. | |
| 2005/0012421 A1 | 1/2005 | Fukuda et al. | |
| 2005/0045414 A1 | 3/2005 | Takagi et al. | |
| 2005/0057061 A1* | 3/2005 | McClure | B62D 43/10 |
| | | | 296/37.2 |
| 2005/0073187 A1 | 4/2005 | Frank et al. | |
| 2005/0131604 A1 | 6/2005 | Lu | |
| 2005/0194816 A1* | 9/2005 | Kiester | B62D 33/02 |
| | | | 296/182.1 |
| 2005/0231145 A1 | 10/2005 | Mukai et al. | |
| 2005/0235767 A1 | 10/2005 | Shimizu et al. | |
| 2005/0235768 A1 | 10/2005 | Shimizu et al. | |
| 2005/0242677 A1 | 11/2005 | Akutsu et al. | |
| 2005/0248173 A1 | 11/2005 | Bejin et al. | |
| 2005/0257989 A1 | 11/2005 | Iwami et al. | |
| 2005/0257990 A1 | 11/2005 | Shimizu | |
| 2005/0267660 A1 | 12/2005 | Fujiwara et al. | |
| 2006/0017301 A1 | 1/2006 | Edwards | |
| 2006/0022619 A1 | 2/2006 | Koike et al. | |
| 2006/0042862 A1 | 3/2006 | Saito et al. | |
| 2006/0055139 A1 | 3/2006 | Furumi et al. | |
| 2006/0061117 A1 | 3/2006 | Lester | |
| 2006/0065472 A1 | 3/2006 | Ogawa et al. | |
| 2006/0075840 A1 | 4/2006 | Saito et al. | |
| 2006/0076180 A1 | 4/2006 | Saito et al. | |
| 2006/0108174 A1 | 5/2006 | Saito et al. | |
| 2006/0131088 A1 | 6/2006 | Pawusch et al. | |
| 2006/0131865 A1 | 6/2006 | Wasek et al. | |
| 2006/0154762 A1 | 7/2006 | Brown | |
| 2006/0162990 A1 | 7/2006 | Saito et al. | |
| 2006/0169525 A1 | 8/2006 | Saito et al. | |
| 2006/0175124 A1 | 8/2006 | Saito et al. | |
| 2006/0180385 A1 | 8/2006 | Yanai et al. | |
| 2006/0181104 A1 | 8/2006 | Khan et al. | |
| 2006/0185741 A1 | 8/2006 | McKee | |
| 2006/0185927 A1 | 8/2006 | Sakamoto et al. | |
| 2006/0191734 A1 | 8/2006 | Kobayashi | |
| 2006/0191735 A1 | 8/2006 | Kobayashi | |
| 2006/0191737 A1 | 8/2006 | Kobayashi | |
| 2006/0191739 A1 | 8/2006 | Koga | |
| 2006/0196721 A1 | 9/2006 | Saito et al. | |
| 2006/0196722 A1 | 9/2006 | Makabe et al. | |
| 2006/0201270 A1 | 9/2006 | Kobayashi | |
| 2006/0207823 A1 | 9/2006 | Okada et al. | |
| 2006/0207824 A1 | 9/2006 | Saito et al. | |
| 2006/0207825 A1 | 9/2006 | Okada et al. | |
| 2006/0208564 A1 | 9/2006 | Yuda et al. | |
| 2006/0212200 A1 | 9/2006 | Yanai et al. | |
| 2006/0219463 A1 | 10/2006 | Seki et al. | |
| 2006/0219469 A1 | 10/2006 | Okada et al. | |
| 2006/0219470 A1 | 10/2006 | Imagawa et al. | |
| 2006/0255610 A1 | 11/2006 | Bejin et al. | |
| 2006/0283914 A1* | 12/2006 | Murase | B62D 33/00 |
| | | | 228/101 |
| 2006/0288800 A1 | 12/2006 | Mukai et al. | |
| 2007/0013181 A1 | 1/2007 | Heck | |
| 2007/0023566 A1 | 2/2007 | Howard | |
| 2007/0068726 A1 | 3/2007 | Shimizu | |
| 2007/0074588 A1 | 4/2007 | Harata et al. | |
| 2007/0074589 A1 | 4/2007 | Harata et al. | |
| 2007/0074927 A1 | 4/2007 | Okada et al. | |
| 2007/0074928 A1 | 4/2007 | Okada et al. | |
| 2007/0095601 A1 | 5/2007 | Okada et al. | |
| 2007/0096449 A1 | 5/2007 | Okada et al. | |
| 2007/0175696 A1 | 8/2007 | Saito et al. | |
| 2007/0242398 A1 | 10/2007 | Ogawa | |
| 2007/0261904 A1 | 11/2007 | Fecteau et al. | |
| 2008/0023240 A1 | 1/2008 | Sunsdahl et al. | |
| 2008/0023249 A1 | 1/2008 | Sunsdahl et al. | |
| 2008/0053743 A1 | 3/2008 | Tomita | |
| 2008/0059034 A1 | 3/2008 | Lu | |
| 2008/0106115 A1 | 5/2008 | Hughes | |
| 2008/0143505 A1 | 6/2008 | Maruyama et al. | |
| 2008/0172155 A1 | 7/2008 | Takamatsu et al. | |
| 2008/0183353 A1 | 7/2008 | Post et al. | |
| 2008/0199253 A1 | 8/2008 | Okada et al. | |
| 2008/0296884 A1 | 12/2008 | Rouhana et al. | |
| 2009/0065285 A1 | 3/2009 | Maeda et al. | |
| 2009/0078491 A1 | 3/2009 | Tsutsumikoshi et al. | |
| 2009/0093928 A1 | 4/2009 | Getman et al. | |
| 2009/0108617 A1 | 4/2009 | Songwe, Jr. | |
| 2009/0152035 A1 | 6/2009 | Okada et al. | |
| 2009/0152036 A1 | 6/2009 | Okada et al. | |
| 2009/0178871 A1 | 7/2009 | Sunsdahl et al. | |
| 2009/0184531 A1 | 7/2009 | Yamamura et al. | |
| 2009/0184540 A1* | 7/2009 | Edwards | B62D 33/0273 |
| | | | 296/183.1 |
| 2009/0189373 A1 | 7/2009 | Schramm et al. | |
| 2009/0301830 A1 | 12/2009 | Kinsman et al. | |
| 2009/0302590 A1 | 12/2009 | Van et al. | |
| 2010/0017059 A1 | 1/2010 | Lu et al. | |
| 2010/0066129 A1* | 3/2010 | Edwards | B60R 13/07 |
| | | | 296/208 |
| 2010/0090797 A1 | 4/2010 | Koenig et al. | |
| 2010/0194086 A1 | 8/2010 | Yamamura et al. | |
| 2010/0211261 A1 | 8/2010 | Sasaki et al. | |
| 2010/0314191 A1 | 12/2010 | Deckard et al. | |
| 2011/0035089 A1 | 2/2011 | Hirao et al. | |
| 2011/0279282 A1 | 11/2011 | Bryant | |
| 2011/0297462 A1 | 12/2011 | Grajkowski et al. | |
| 2011/0298189 A1 | 12/2011 | Schneider et al. | |
| 2011/0304114 A1 | 12/2011 | Spanjers | |

(56) References Cited

U.S. PATENT DOCUMENTS

| | | |
|---|---|---|
| 2011/0309118 A1 | 12/2011 | Wada |
| 2012/0029770 A1 | 2/2012 | Hirao et al. |
| 2012/0078470 A1 | 3/2012 | Hirao et al. |
| 2012/0085588 A1 | 4/2012 | Kinsman et al. |
| 2012/0193163 A1 | 8/2012 | Wimpfheimer et al. |
| 2012/0223500 A1 | 9/2012 | Kinsman et al. |
| 2012/0247888 A1 | 10/2012 | Chikuma et al. |
| 2013/0033070 A1 | 2/2013 | Kinsman et al. |
| 2013/0041545 A1 | 2/2013 | Baer et al. |
| 2013/0079988 A1 | 3/2013 | Hirao et al. |
| 2013/0199097 A1 | 8/2013 | Spindler et al. |
| 2013/0319785 A1 | 12/2013 | Spindler et al. |
| 2013/0338869 A1 | 12/2013 | Tsumano |
| 2014/0103627 A1 | 4/2014 | Deckard et al. |
| 2014/0294195 A1 | 10/2014 | Perez et al. |
| 2014/0358373 A1 | 12/2014 | Kikuchi et al. |
| 2015/0002404 A1 | 1/2015 | Hooton |
| 2015/0029018 A1 | 1/2015 | Bowden et al. |
| 2015/0039199 A1 | 2/2015 | Kikuchi |
| 2015/0057885 A1 | 2/2015 | Brady et al. |
| 2015/0061275 A1 | 3/2015 | Deckard et al. |
| 2015/0078580 A1 | 3/2015 | Schwerdtfeger et al. |
| 2015/0210137 A1 | 7/2015 | Kinsman et al. |
| 2015/0259011 A1* | 9/2015 | Deckard ............... B60K 13/04 280/781 |
| 2016/0059660 A1 | 3/2016 | Brady et al. |
| 2016/0332553 A1 | 11/2016 | Miller et al. |
| 2016/0332676 A1 | 11/2016 | Miller et al. |
| 2017/0013336 A1 | 1/2017 | Stys et al. |
| 2017/0036617 A1* | 2/2017 | Greggs ..................... B60P 1/44 |
| 2017/0120946 A1 | 5/2017 | Gong et al. |
| 2017/0131095 A1 | 5/2017 | Kim |
| 2017/0199094 A1 | 7/2017 | Duff et al. |
| 2017/0247062 A1* | 8/2017 | Vu ........................... B60R 13/01 |
| 2017/0334500 A1 | 11/2017 | Jarek et al. |
| 2018/0007466 A1 | 1/2018 | Hess et al. |
| 2018/0022391 A1 | 1/2018 | Erspamer et al. |
| 2018/0065465 A1 | 3/2018 | Ward et al. |
| 2018/0326843 A1* | 11/2018 | Danielson ............. B60K 20/06 |
| 2018/0328321 A1 | 11/2018 | Toda et al. |
| 2019/0110161 A1 | 4/2019 | Rentz et al. |
| 2019/0143871 A1 | 5/2019 | Weber et al. |
| 2019/0193501 A1 | 6/2019 | Brady et al. |
| 2019/0210668 A1 | 7/2019 | Endrizzi et al. |
| 2019/0215606 A1 | 7/2019 | You et al. |
| 2019/0217909 A1 | 7/2019 | Deckard et al. |
| 2019/0256010 A1 | 8/2019 | Baba et al. |
| 2019/0265064 A1 | 8/2019 | Koenig et al. |
| 2019/0306599 A1 | 10/2019 | Nagai et al. |
| 2020/0001673 A1 | 1/2020 | Schlangen et al. |
| 2020/0070709 A1 | 3/2020 | Weber et al. |
| 2020/0122776 A1 | 4/2020 | Schlangen et al. |
| 2020/0262285 A1 | 8/2020 | Sunsdahl et al. |
| 2020/0363054 A1 | 11/2020 | Wilson et al. |
| 2021/0024007 A1 | 1/2021 | Fredrickson et al. |
| 2021/0070374 A1* | 3/2021 | Domon ................... B62D 25/20 |
| 2021/0206438 A1 | 7/2021 | Levin et al. |
| 2022/0041115 A1 | 2/2022 | Fredrickson et al. |
| 2022/0073154 A1* | 3/2022 | Peterson ................ B60N 2/305 |
| 2022/0135145 A1* | 5/2022 | Veillette ............... B62D 21/183 180/291 |
| 2022/0315115 A1* | 10/2022 | Lyons ..................... B60K 11/02 |
| 2023/0150588 A1 | 5/2023 | Deckard et al. |
| 2023/0339541 A1* | 10/2023 | Nysse ................... B62D 65/024 |
| 2024/0157898 A1* | 5/2024 | Wuollet ............. B62D 33/0273 |
| 2024/0174184 A1 | 5/2024 | Fredrickson et al. |
| 2024/0326931 A1* | 10/2024 | Purcell ................ B62D 21/183 |

FOREIGN PATENT DOCUMENTS

| | | |
|---|---|---|
| CN | 1489675 A | 4/2004 |
| CN | 1646359 A | 7/2005 |
| CN | 201007087 Y | 1/2008 |
| CN | 202986930 U | 6/2013 |
| CN | 104442637 A | 3/2015 |
| CN | 104564935 A | 4/2015 |
| CN | 104661903 A | 5/2015 |
| CN | 104703866 A | 6/2015 |
| CN | 204437029 U | 7/2015 |
| CN | 204511639 U | 7/2015 |
| CN | 105730221 A | 7/2016 |
| CN | 107251577 A | 10/2017 |
| CN | 107635800 A | 1/2018 |
| CN | 108859990 A | 11/2018 |
| DE | 2752798 A1 | 6/1978 |
| DE | 3007726 A1 | 9/1981 |
| DE | 102004049557 A1 | 4/2006 |
| DE | 102010020544 A1 | 1/2011 |
| EP | 0697306 A1 | 2/1996 |
| EP | 1548298 A2 | 6/2005 |
| FR | 2907410 A1 | 4/2008 |
| GB | 2316923 A | 3/1998 |
| JP | 53-101625 A | 9/1978 |
| JP | 2000-025494 A | 1/2000 |
| JP | 2005-193788 A | 7/2005 |
| JP | 2006-232058 A | 9/2006 |
| JP | 2006-232061 A | 9/2006 |
| JP | 2006-256579 A | 9/2006 |
| JP | 2006-256580 A | 9/2006 |
| JP | 2006-281839 A | 10/2006 |
| JP | 2007-106319 A | 4/2007 |
| JP | 2010-095106 A | 4/2010 |
| WO | 84/00524 A1 | 2/1984 |
| WO | 03/41446 A2 | 5/2003 |
| WO | 03/70543 A1 | 8/2003 |
| WO | 2009/096998 A1 | 8/2009 |
| WO | 2013/047741 A1 | 4/2013 |
| WO | 2014/039432 A2 | 3/2014 |
| WO | 2014/039433 A2 | 3/2014 |
| WO | 2014/047488 A1 | 3/2014 |
| WO | 2014/059258 A1 | 4/2014 |
| WO | 2017/187413 A1 | 11/2017 |
| WO | 2019/140026 A1 | 7/2019 |

OTHER PUBLICATIONS

"Evolution of the RZR: Which One is the Best?" Aug. 23, 2018. Youtube. https://www.youtube.com/watch?v=QE6VyxWxoow.

Polaris RZR XP4 1000 Launch Video—Polaris RZR Sport Side By Side ATV. Apr. 25, 2014. Youtube, https://www.youtube.com/watch?v=roncbPaRIMU.

2009 Honda Big Red, ATV Illustrated at http://www.atvillustrated.com/?q=node/6615/20/2008, 6 pgs.

2016 MUDPRO 700 Limited, Artic Cat, http://www.articcat.com/dirt/atvs/model/2016-en-mudpro-700-limited/, copyright 2015, 23 pages.

All-Terrain Vehicles. Design—(Copyrights) Questel orbit.com. [Online PDF compilation of references selected by examiner] 72 pgs. Print Dates Range Aug. 7, 2020-Mar. 18, 2019 [Retrieved Jun. 25, 2021].

Arctic Cat, company website, Prowler XT 650 H1, undated, 9 pgs.

BRP Can-Am Commander photo, undated; 1 page.

Buyer's Guide Supplement, 2006 Kart Guide, Powersports Business Magazine; 6 pages.

Club Car, Company Website, product pages for XRT 1500 SE, undated; 2 pages.

DuneGuide.com, "Product Review 2009 Honda Big Red MUV," retrieved from http:www.duneguide.com/ProductReview.sub.--Honda.sub.--BigRed.htm, May 20, 2008, 3 pgs.

High-Performance "Truck Steering" Automotive Engineering, Society of Automotive Engineers. Warrendale, US, vol. 98. No. 4, Apr. 1, 1990, pp. 56-60.

Honda Hippo 1800 New Competition for Yamaha's Rhino, Dirt Wheels Magazine, Apr. 2006, pp. 91-92.

International Preliminary Report on Patentability issued by The International Bureau of WIPO, dated Apr. 14, 2015, for International Patent Application No. PCT/US2013/064516; 18 pages.

International Preliminary Report on Patentability received for PCT Patent Application No. PCT/US2019/012958, mailed on Jul. 23, 2020, 20 pages.

(56) References Cited

OTHER PUBLICATIONS

International Preliminary Report on Patentability received for PCT Patent Application No. PCT/US2020/042787, mailed on Jun. 24, 2021, 17 pages.
International Search Report and Written Opinion issued by the European Patent Office, dated Jan. 14, 2014, for International Patent Application No. PCT/US2013/064516; 24 pages.
International Search Report and Written Opinion issued by the International Searching Authority, dated Oct. 21, 2020, for International Patent Application No. PCT/US2020/42787; 18 pages.
International Search Report and Written Opinion received for PCT Patent Application No. PCT/US2019/012958, mailed on Jul. 3, 2019, 27 pages.
Kawasaki Mule The Off-Road Capable 610 4 .times. 4 XC Brochure 2011, .COPYRGT. 2010, 6 pages.
Kawasaki Mule Utility Vehicle Brochure 2009, .COPYRGT. 2008; 10 pages.
Kawasaki Teryx 750 Fl 4 × 4 Sport Brochure 2011, (Copyrights) 2010; 6 pages.
MTX (IMTX Audio Thunder Sports RZRPod65-owners-manual, 2016); 8 pages.
Office Action issued by the Chinese Patent Office, dated Jun. 9, 2021, for Chinese Patent Application No. 201980007897.1; 6 pages (3 pages of English Translation and 3 pages of Original Document).
Outlander X mr 850, available at https://can-am.brp.com/off-road/atv/outlander/outlander-x-mr-850.html; .COPYRGT. 2003-2017; 3 pages.
Patent Examination Report issued by the Australian Government IP Australia, dated Apr. 7, 2016, for Australian Patent Application No. 2013329090; 3 pages.
Polaris Ranger Brochure 2009, copyright 2008; 32 pages.
Polaris Ranger Brochure ATVs and Side .times. Sides Brochure 2010, .COPYRGT. 2009, 26 pages.
Polaris Ranger Off-Road Utility Vehicles Brochure 2004, .COPYRGT. 2003; 20 pages.
Polaris Ranger RZR Brochure 2011, .COPYRGT. 2010; 16 pages.
Polaris Ranger Welcome to Ranger Country Brochure 2006, .COPYRGT. 2005, 24 pages.
Ray Sedorchuk, New for 2004, Yamaha Rhino 660 4 × 4, ATV Connection Magazine, (Copyrights) 2006; 3 pages.
Redline Specs, copyright 2008, available at www.RedlinePerforms.com., 2 pages.
Renegade X MR 1000R, Can-Am, http://can-am.brp.com/off-road/atv/renegade/renegade-x-mr-1000R.html, copyright 2003-2015, 12 pages.
Select Increments 2007-2018 Compatible With Jeep Wrangler JK and Unlimited With Infinity or Alpine Premium Factory Systems Pillar Pods with Kicker speakers PP0718-IA-K (Select), Dec. 14, 2018; 6 pages.
Work/Play Only Ranger brochure, .COPYRGT. 2007, Polaris Industries Inc., 28 pgs.
Yamaha, Company Website, 2006 Rhino 450 Auto 4 .times. 4, .COPYRGT. 2005, 3 pages.
Yamaha, Company Website, Rhino 660 Auto 4 × 4 Exploring Edition Specifications, (Copyrights) 2006; 3 pages.

* cited by examiner

UTILITY VEHICLE FLUID CONTAINMENT SYSTEM

TECHNICAL FIELD

The present disclosure relates to a cargo box assembly for a utility, recreational, or off-road vehicle.

BACKGROUND

Utility, recreational, or off-road vehicles often have cargo box assemblies that are configured to store cargo. Due to spills of liquid cargo, weather elements such as rain or snow, and/or other factors, fluid may be retained within the cargo box assembly.

SUMMARY

The present disclosure relates to configurations of the cargo box assembly which prevent fluid build-up therein and are configured for directing fluid flow from the cargo box.

In some examples, a vehicle may include a frame supported by a plurality of ground engaging members, a powertrain supported by the frame, and a cargo bed supported by the frame. The cargo bed may include a bed floor extending between a first wall and a second wall. A drain may be coupled to a rearward portion of the cargo bed. The drain may be configured to direct fluid from the bed floor to a position rearward of the bed floor and away from at least a portion of the powertrain.

In some examples, a cargo box assembly for a utility vehicle may include a cargo bed comprising a bed floor, a first wall, a second wall, as well as a tailgate, a seal, and a drain. The first wall may be sealingly coupled to a first edge of the bed floor. The second wall may be sealingly coupled to a second edge of the bed floor, such that the first edge is opposing and substantially parallel to the second edge. The tailgate may extend from a third edge of the bed floor, between the first wall and the second wall. The seal may be positioned intermediate at least a portion of the tailgate and the bed floor. Additionally, the seal may define a seal opening configured to allow fluid to pass between the bed floor and the tailgate. The drain may be coupled to the cargo bed and define a drain opening positioned vertically below the seal opening. The drain may be configured to direct the fluid away from a selected portion of the utility vehicle.

In some examples, a drain assembly for a cargo box assembly may include a drain, a seal, and a wick. The cargo box assembly may include a cargo bed having a cargo bed width and a tailgate coupled to a rearward portion of the cargo bed. The drain of the drain assembly may be coupled to a rearward portion of the cargo bed along a drain width. Also, the drain may define a drain opening directed generally downwardly. The seal may be positioned intermediate the cargo bed and the tailgate, and define a seal opening fluidly coupled to the drain. The wick may be coupled to a bottom of the tailgate and configured to direct fluid from the tailgate toward the drain.

DETAILED DESCRIPTION

For the purposes of promoting an understanding of the principles of the present disclosure, reference is now made to the embodiments illustrated in the drawings, which are described below. The embodiments disclosed below are not intended to be exhaustive or limit the present disclosure to the precise form disclosed in the following detailed description. Rather, the embodiments are chosen and described so that others skilled in the art may utilize their teachings. Therefore, no limitation of the scope of the present disclosure is thereby intended. Corresponding reference characters indicate corresponding parts throughout the several views.

The terms "couples", "coupled", "coupler", and variations thereof are used to include both arrangements wherein two or more components are in direct physical contact and arrangements wherein the two or more components are not in direct contact with each other (e.g., the components are "coupled" via at least a third component, but still cooperates or interact with each other).

In some instances throughout this disclosure and in the claims, numeric terminology, such as first, second, third, and fourth, is used in reference to various operative transmission components and other components and features. Such use is not intended to denote an ordering of the components. Rather, numeric terminology is used to assist the reader in identifying the component being referenced and should not be narrowly interpreted as providing a specific order of components.

The present disclosure describes cargo box assemblies of utility vehicles that are configured to reduce fluid build-up in the cargo box, direct fluid flow from the cargo box toward a selected location, or both. For example, the described cargo box assemblies may direct fluid away from hot components of a utility vehicle. In some examples, the cargo box assemblies may include a drain assembly configured to channel fluid from within a cargo bed, a seal configured to control fluid flow between a tailgate and the cargo bed, and a wick configured to direct fluid from the tailgate toward the drain. By controlling the flow of fluid from the cargo box, the described cargo box assemblies may improve useable life of selected components, and prevent fluids from being directed, directly or indirectly, towards hot components of the vehicle.

Figure 1:
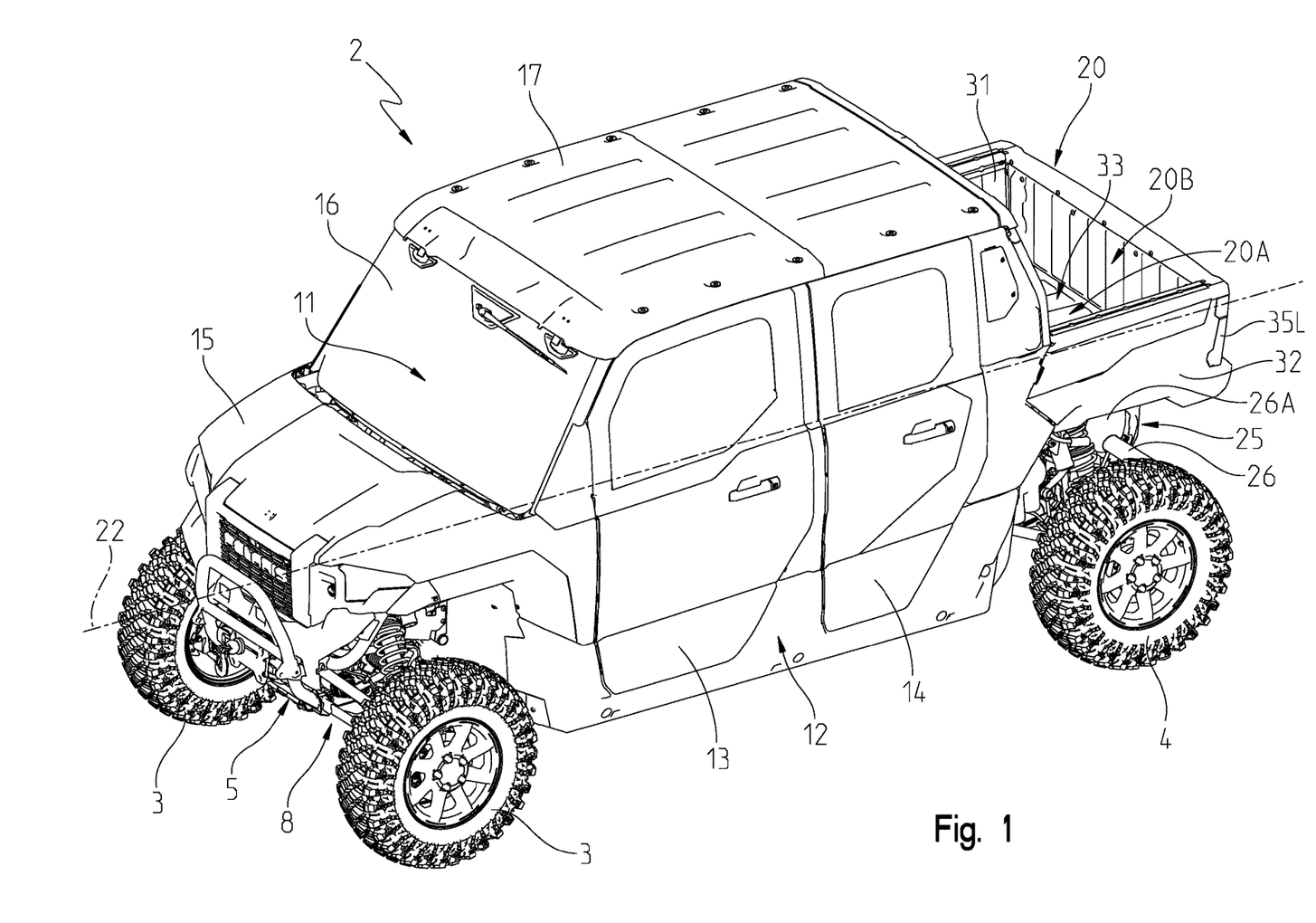
FIG. 1 is a front left perspective view of a vehicle of the present disclosure.
Figure 2:
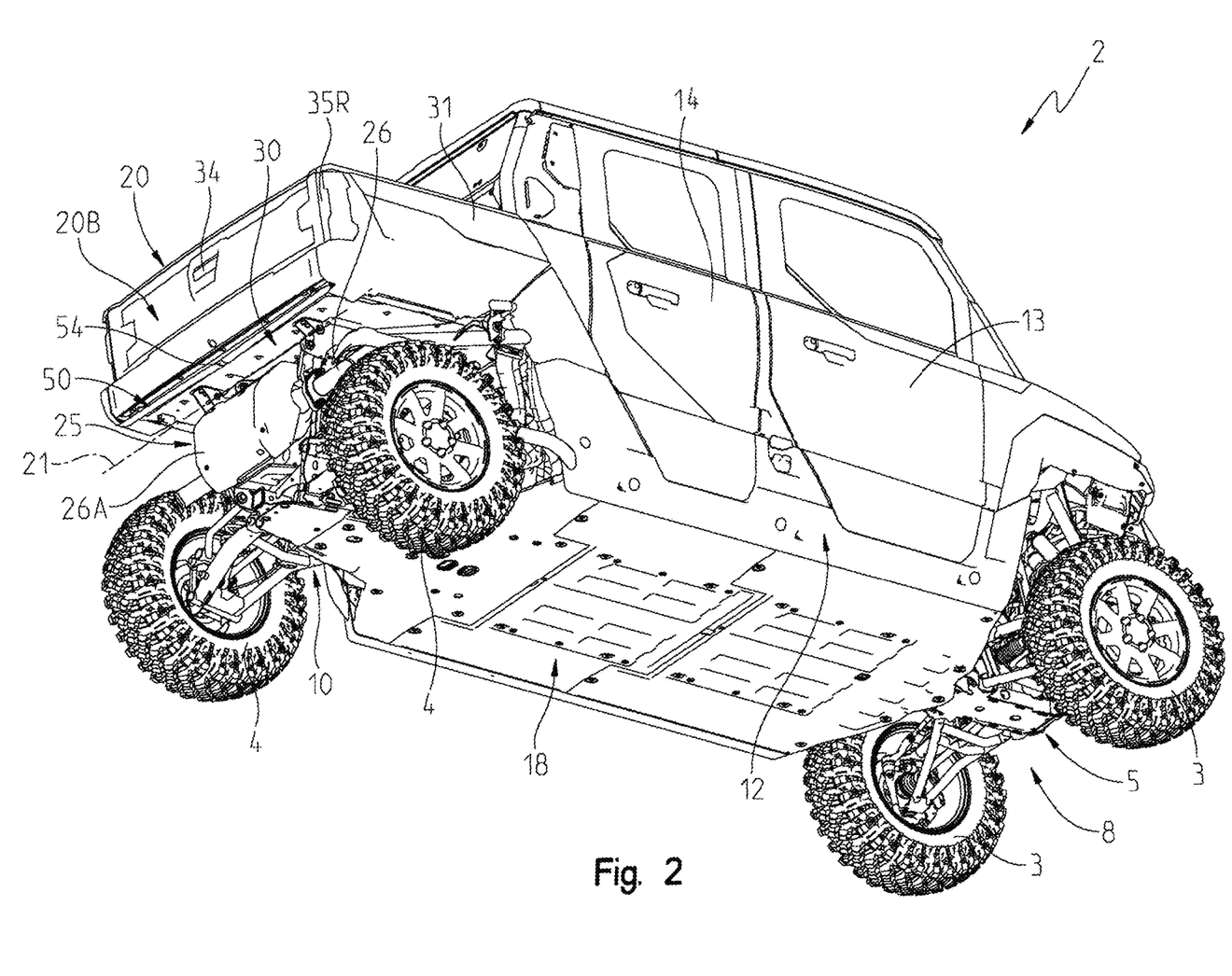
FIG. 2 is a rear right perspective view of the vehicle of FIG. 1.

FIGS. 1 and 2 are conceptual diagrams illustrating an example vehicle 2. Vehicle 2 includes a plurality of ground engaging members, such as, for example a pair of front ground engaging members 3 and a pair of rear ground engaging members 4. As illustrated in FIGS. 1 and 2, front ground engaging members 3 and rear ground engaging members 4 are wheels. In other examples, any of front ground engaging members 3 or rear ground engaging members 4 may be wheels, tracks, skis, or other types of ground engaging members. Vehicle 2 also includes a frame 5 supported by ground engaging members 3 and 4. Frame 5 may include a plurality of frame portions, such as, for example, a lower frame assembly and an upper frame assembly. An operator area 11 may be defined by frame 5, e.g., portions of the upper and lower frame assemblies, and may further be configured to support an operator and possibly at least one passenger, as well as a variety of operator inputs. Example operator inputs include a steering input such as a steering wheel or a handlebar, a throttle control such as an accelerator pedal or a throttle input, a brake control such as a brake pedal or a brake lever, a clutch control, a transmission or gear shifting control, or other input devices configured to control an operation of vehicle 2. Further, vehicle 2 also may include a skid plate 18 configured to protect and surround at least a portion of frame 5. Skid plate 18 may be a single piece or a plurality of pieces.

As illustrated in FIGS. 1 and 2, vehicle 2 includes a front suspension 8 coupled between frame 5 and front ground engaging members 3 and a rear suspension 10 coupled between frame 5 and rear ground engaging members 4. Front suspension 8 may be a dual A-arm suspension. In other examples, front suspension 8 may be a strut-style suspension or another type of suspension. Rear suspension 10 may be a strut style suspension. In various embodiments, rear suspension 10 may be a dual A-arm suspension, a trailing arm suspension, a swingarm suspension, or another type of suspension. Although illustrated as including a dual A-arm front suspension and a strut style rear suspension, in other example, vehicle 2 may include any front or rear suspension suitable for the operation over in a particular terrain.

Vehicle 2 includes a body 12 supported by frame 5. Body 12 includes a pair of front doors 13 and a pair of rear doors 14. In various embodiments, front doors 13 and rear doors 14 are not required. Body 12 also includes a hood 15 positioned generally adjacent front fenders or side panels. In some examples, a windshield 16 may be positioned forwardly of operator area 11 and configured to reduce intrusion of dust, debris, and water into operator area 11. Body 12 also may include a roof 17 supported by an upper portion of frame 5 and positioned above operator area 11. Body 12 may include a utility or cargo box assembly 20 positioned rearward of operator area 11 and generally above at least a portion of rear suspension 10.

Vehicle 2 also includes a powertrain 25 supported by frame 5 and, in at least one embodiment, positioned generally beneath cargo box assembly 20. Powertrain 25 may include an internal combustion engine (not shown), a hybrid powertrain, or an electric powertrain. In various embodiments of powertrain 25, an intake assembly (not shown) and an exhaust assembly (not shown) may be fluidly coupled to the engine. The exhaust assembly may include at least one hot component, such as exhaust conduit 26, and an exhaust shield, such as cover 26A. In various embodiments, cover 26A may be positioned over at least a portion of exhaust conduit 26 and configured to provide thermal insulation between the portion of exhaust conduit 26 and vehicle 2, or an operator of vehicle 2 or cargo box assembly 20.

Additional details regarding vehicle 2 can be found in U.S. application Ser. No. 17/708,327, filed Mar. 30, 2022, titled OFF-ROAD VEHICLE, the entire disclosure of which is expressly incorporated by reference herein.

Figure 5:
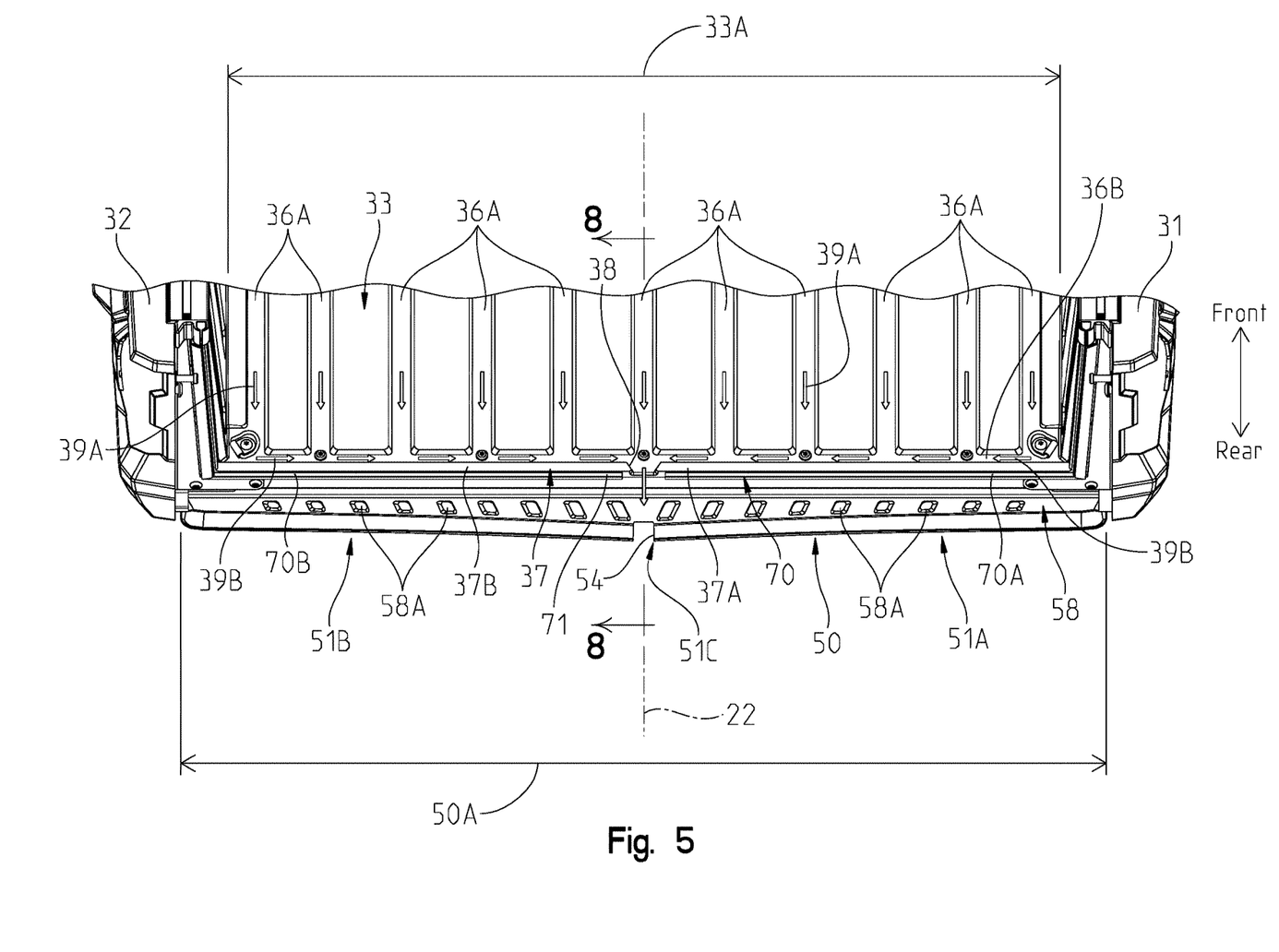
FIG. 5 is a top view of a cargo bed of the cargo box assembly of FIG. 3 without a tailgate of the cargo box assembly.

As illustrated in FIGS. 1 and 2, cargo box assembly 20 includes a utility bed, or cargo bed 20A and a tailgate or rear wall 20B. Cargo bed 20A is defined by a first side wall 31, a second side wall 32, and a cargo bed floor 33. First side wall 31 and second side wall 32 extend generally longitudinally and may be parallel to a vehicle centerline 22. First side wall 31 and second side wall 32 are spaced apart from one another and coupled together by cargo bed floor 33. In the present embodiment, first side wall 31 and second side wall 32 are spaced by a cargo bed floor width 33A (FIG. 5). A front wall (not shown) is coupled to cargo bed floor 33, first side wall 31, and second side wall 32. In the present embodiment, the interfaces between first side wall 31, second side wall 32, front wall, and cargo bed floor 33 are sealed. The term seal may include a joint between two or more surfaces or components that is configured to reduce or prevent selected material, such as solid debris, water, liquid fuel, or the like, from passing between the two or more surfaces or components. In the present embodiment, tailgate 20B is configured to be coupled to cargo bed 20A and is illustratively configured to rotate between a closed position (i.e., shown in FIGS. 1 and 2, tailgate 20B is positioned generally perpendicular to cargo bed floor 33) and an open position (i.e., tailgate 20B is generally parallel to cargo bed floor 33).

Figure 3:
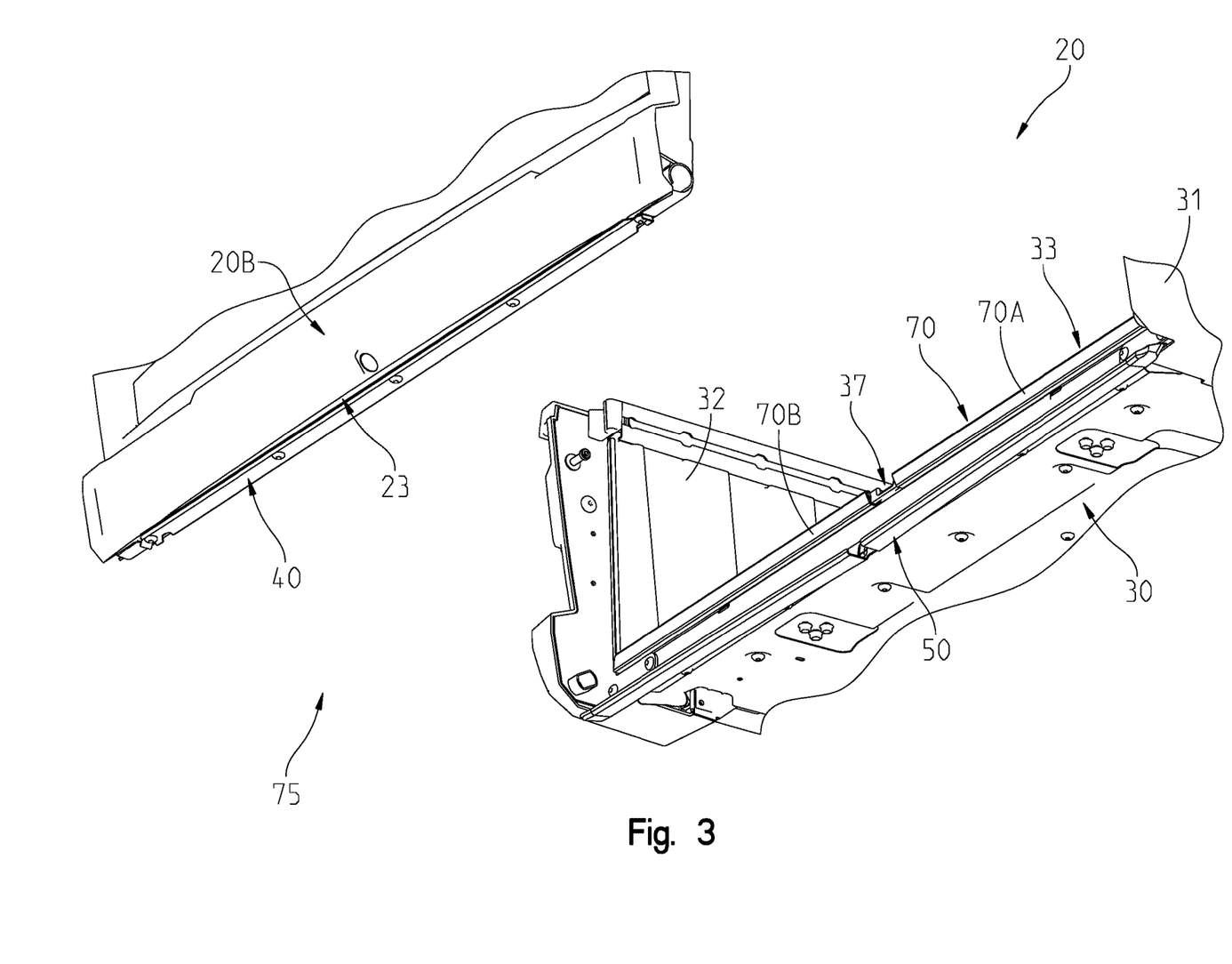
FIG. 3 is an exploded view of a portion of a cargo box assembly of the vehicle of FIG. 1.

FIG. 3 is a conceptual diagram illustrating a partially exploded view of cargo box assembly 20. As illustrated in FIG. 3, a seal 70 is coupled to cargo bed 20A to seal at least a portion of the interface between cargo bed 20A and tailgate 20B. In one embodiment, tailgate 20B is configured as a stationary rear wall and does not rotate between open and closed positions.

In the present embodiment, tailgate 20B further includes a latch, or handle 34 (FIG. 2) configured to actuate a latch assembly (not shown) to allow tailgate 20B to rotate between the open position and the closed position. Cargo box assembly 20 also has a left taillight 35L and a right taillight 35R. In various embodiments, left taillight 35L and right taillight 35R may be on cargo bed 20A, tailgate 20B, or on each of cargo bed 20A and tailgate 20B.

In some examples, cargo box assembly 20 may be configured to rotate relative to frame 5. For example, a box bottom 30 of cargo box assembly 20 may be rotatably coupled to frame 5 such that cargo box assembly 20 is configured to rotate about box rotation axis 21. In the present embodiment, box rotation axis 21 is positioned vertically above at least a portion of powertrain 25. For example, in various embodiments, box rotation axis 21 is positioned vertically above and vertically aligned with a portion of exhaust conduits 26 or cover 26A. In various embodiments, box rotation axis 21 is positioned vertically above exhaust conduits 26 or cover 26A on or near a plane extending vertically from a rear most portion of exhaust conduits 26 or cover 26A.

Referring now to FIGS. 3-7, cargo box assembly 20 includes a drain assembly 75 configured to direct fluid within, or passing through, cargo bed 20A toward one or more selected locations. Drain assembly 75 may include a drain 50 and a wick 40. Referring to FIG. 3, drain 50 is coupled to a portion of cargo box bottom 30 (e.g., a lower surface of cargo bed floor 33). In this way, drain 50 is generally positioned lower than a cargo, or uppermost surface, of cargo bed floor 33. In the present embodiment, wick 40 is coupled to a bottom extent 23 of tailgate 20B.

Drain 50 may include one or more drain channels configured to direct material toward a selected location. For example, referring to FIG. 4, drain 50 includes a first drain 51A and a second drain 51B. Illustratively, first drain 51A comprises a first trough 56A and a first flange 52A. Illustratively, first flange 52A is configured to retain fluid that flows within first trough 56A. Additionally, second drain 51B comprises a second trough 56B and a second flange 52B. Illustratively, second flange 52B is configured to retain fluid that flows within second trough 56B. Each of first drain 51A and second drain 51B are angled downwardly toward a middle or center portion 51C of drain 50. An opening 54 is positioned in center portion 51C (e.g., a drain middle portion of drain 50) intermediate first drain 51A and second drain 51B. Illustratively, opening 54 is positioned at or defines a bottom extent of drain 50. In other words, first drain 51A and second drain 51B are angled towards each other and converge or otherwise meet at center portion 51C.

Figure 4:
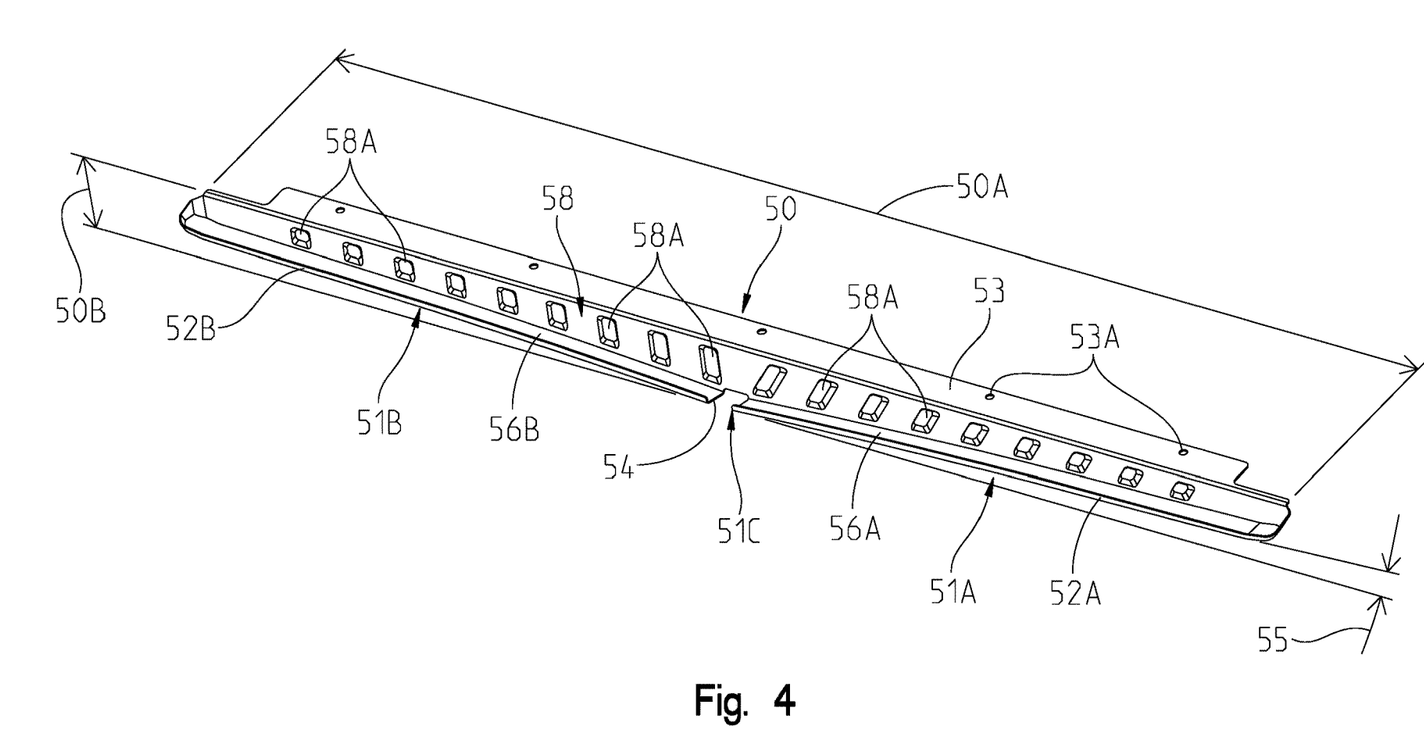
FIG. 4 is a perspective view of a drain of a drain assembly of the cargo box assembly of FIG. 3.

In the present embodiment, each of first drain 51A and second drain 51B are angled downwardly, from a lateral outer extent, toward center portion 51C at an angle 55 relative to a substantially horizontal plane of vehicle 2. In the present embodiment, angle 55 is approximately two degrees. In various embodiments, angle 55 may be within a range from about one degree to about 30-degrees, such as about two degrees to about 15-degrees.

Figure 6:
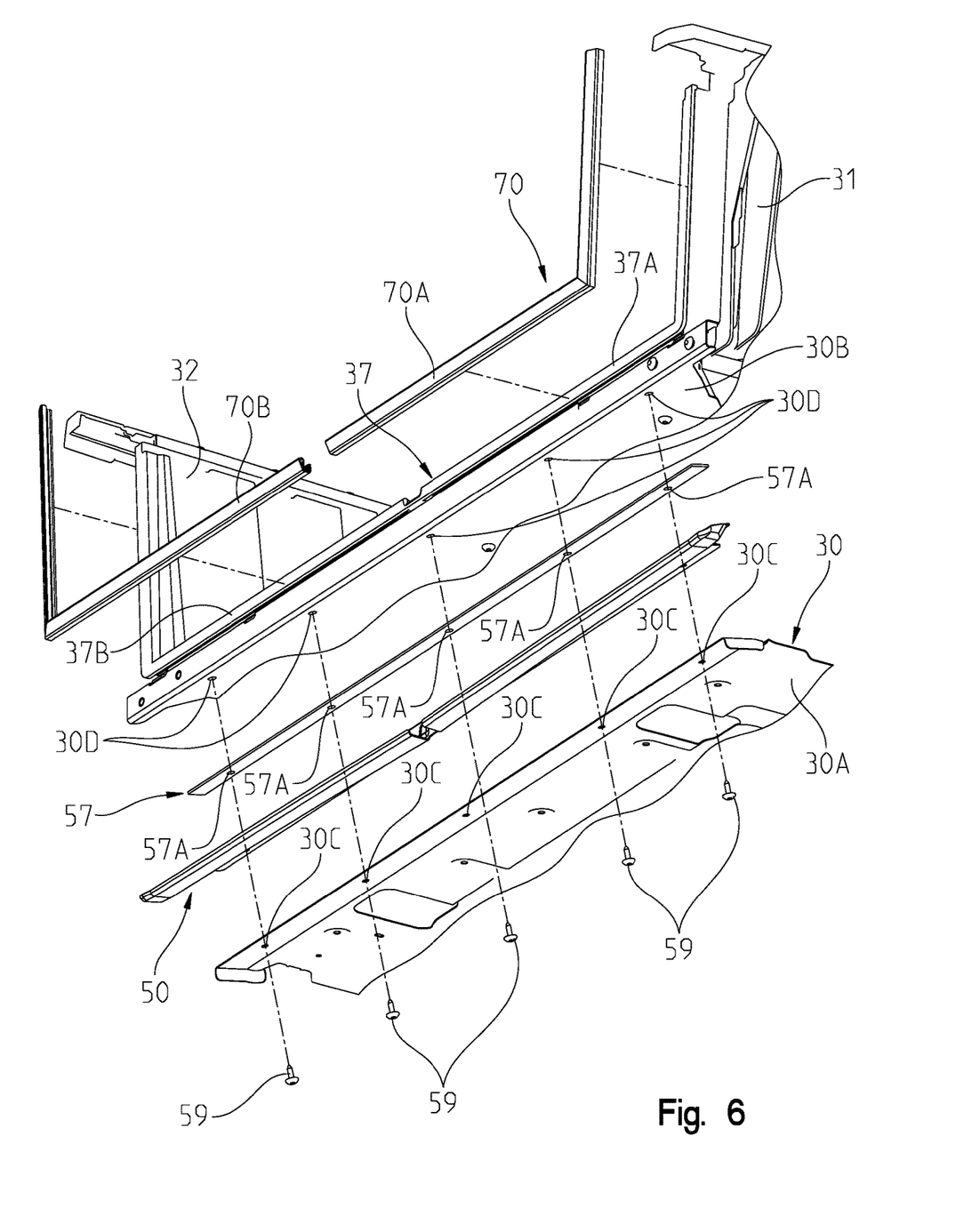
FIG. 6 is an exploded view of the drain assembly of FIG. 4 coupled to the cargo box assembly.

Still referring to FIG. 4, drain 50 comprises a drain wall 58 extending generally vertically and laterally. Drain wall 58 may define a plurality of bosses or indents 58A which may strengthen drain wall 58. Drain wall 58 partially defines first drain 51A and second drain 51B and extends continuously therebetween. In this way, first drain 51A may be generally defined by a portion of drain wall 58 and flange 52A while second drain may be generally defined by a portion of drain wall 58 and flange 52B. A flange 53 may be coupled to or integrally formed with drain wall 58. Flange 53 may include a plurality of apertures 53A configured to receive a fastener 59 (FIG. 6). In the present embodiment, drain 50 has a drain width 50A and a drain height 50B. In the present embodiment, drain width 50A is greater than a cargo bed floor width 33A. In various embodiments, drain width 50A is less than cargo bed floor width 33A. For example, drain width 50A may be less than cargo bed floor width 33A and greater than a width of at least one of exhaust conduit 26 and/or cover 26A. In various embodiments, drain width 50A is greater than about fifty-percent of cargo bed floor width 33A. In various embodiments, drain width 50A is greater than about seventy-five percent of cargo bed floor width 33A. In various embodiments, drain width 50A is greater than about twenty-five percent of cargo bed floor width 33A.

Now referring to FIG. 5, cargo bed floor 33 includes a plurality of longitudinal channels 36A and at least one horizontal channel 36B. Illustratively, horizontal channel 36B extends continuously and entirely along a rear extent of cargo bed floor 33 and is generally adjacent drain 50 and/or tailgate 20B. In the present embodiment, longitudinal channels 36A are configured to direct fluid within cargo bed 20A toward a rear of cargo bed 20A into the at least one horizontal channel 36B.

An extension or flange 37 is positioned rearwardly of the at least one horizontal channel 36B and extends generally upwardly from cargo bed floor 33. In the present embodiment, extension 37 includes a first extension portion 37A and second extension portion 37B separated by an extension opening 38. Illustratively, extension opening 38 is positioned along the vehicle centerline 22. In the present embodiment, extension 37 extends upwardly about one-half inch. In other examples, extension 37 may extend upwardly about one-quarter inch, about one inch, or another height. In various embodiments, extension 37 is a greater height than the remaining portions of cargo bed floor 33. In some examples, the height of extension 37 may be based on a total volume defined by the height of extension 37 and the area of cargo bed floor 33. For example, height of extension 37 may be selected such that the total volume is greater than one gallon, such as greater than 5 gallons or greater than ten gallons.

In some examples, seal 70 includes a first seal portion 70A and a second seal portion 70B positioned adjacent first extension portion 37A and second extension portion 37B, respectively. First seal portion 70A and second seal portion 70B are configured to separate cargo bed floor 33 from tailgate 20B and seal the space therebetween. First seal portion 70A also extends upwardly to separate tailgate 20B and first side wall 31 and second seal portion 70B extends upwardly to separate tailgate 20B and second side wall 32. First seal portion 70A and second seal portion 70B are separated by a seal opening 71. Illustratively, seal 70 is positioned adjacent extension 37. Further, in the present embodiment, seal opening 71 is aligned with opening 38. Referring to FIG. 6, each of seal 70A and seal 70B are shaped as a right-angle and configured to extend along a rearward edge of cargo bed floor 33. Further, seal 70A is configured to extend along a rearward edge of first side wall 31 and seal 70B is configured to extend along a rearward edge of second side wall 32.

As illustrated in FIG. 5, each of extension opening 38, seal opening 71, and opening 54 are at least partially longitudinally aligned, thereby generally forming a fluid channel. In various embodiments, any of extension opening 38, seal opening 71 and opening 54 are at least partially laterally aligned. Cargo box assembly 20 is configured such that at least a portion of fluid within cargo box assembly 20 is directed through one or more channels 36A and into channel 36B, and each of first extension portion 37A and second extension portion 37B are configured to prevent or minimize fluid from flowing onto, and stagnating on, seal 70. That is, extension 37 extends vertically higher from cargo bed floor 33 than seal 70, thereby reducing the flow of fluid within cargo box assembly 20 onto seal 70 relative to a configuration in which extensions do not extend vertically higher from a cargo bed floor than a seal. Fluid that stagnates on seal 70 may reduce the useful life of seal 70, or otherwise at least partially reduce a functionality of seal 70.

Figure 8:
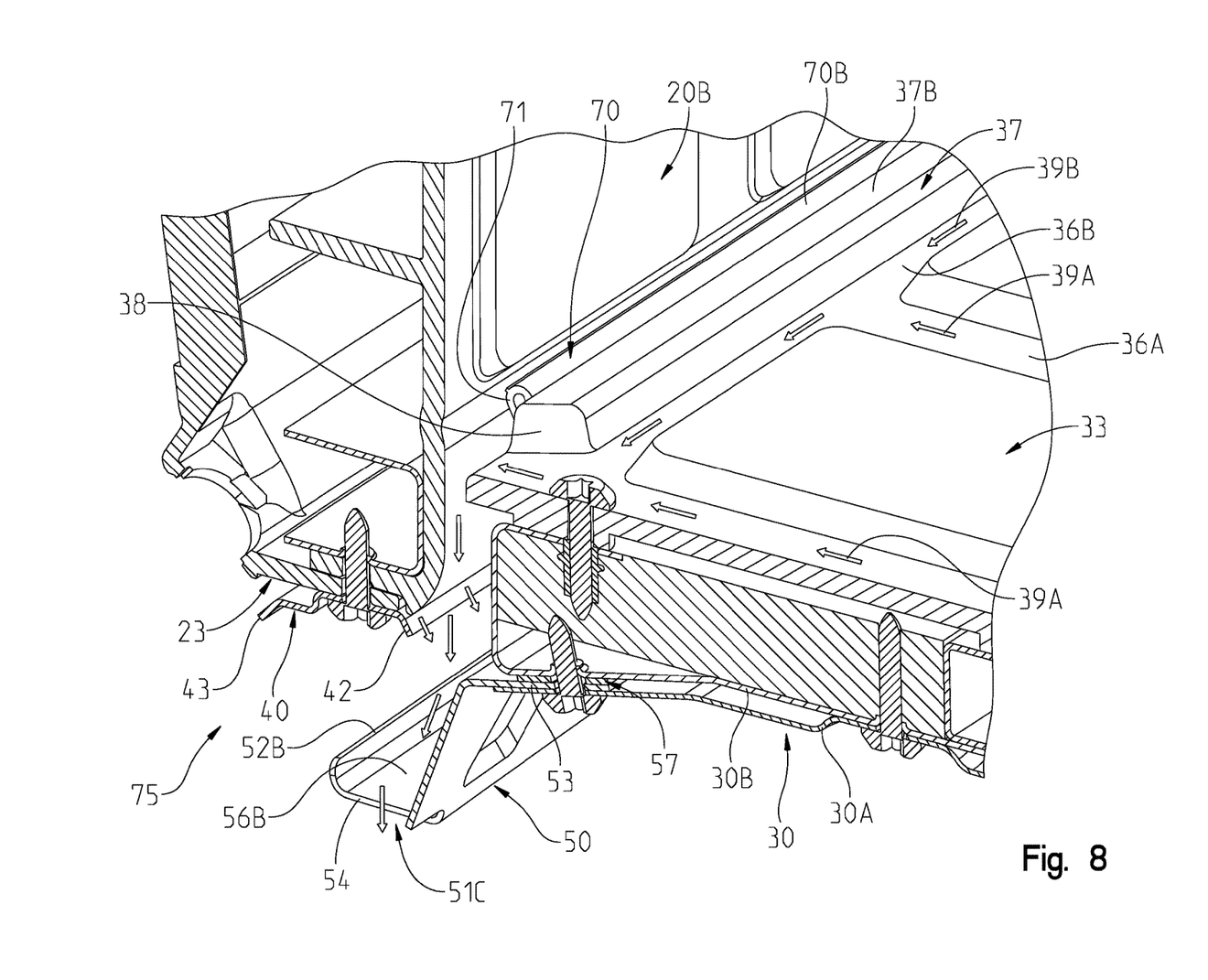
FIG. 8 is a cross-sectional view of the cargo box assembly of the vehicle of FIG. 1, taken along line 8-8 of FIG. 5 illustrating an exemplary fluid path with the tailgate in a closed position.
Figure 9:
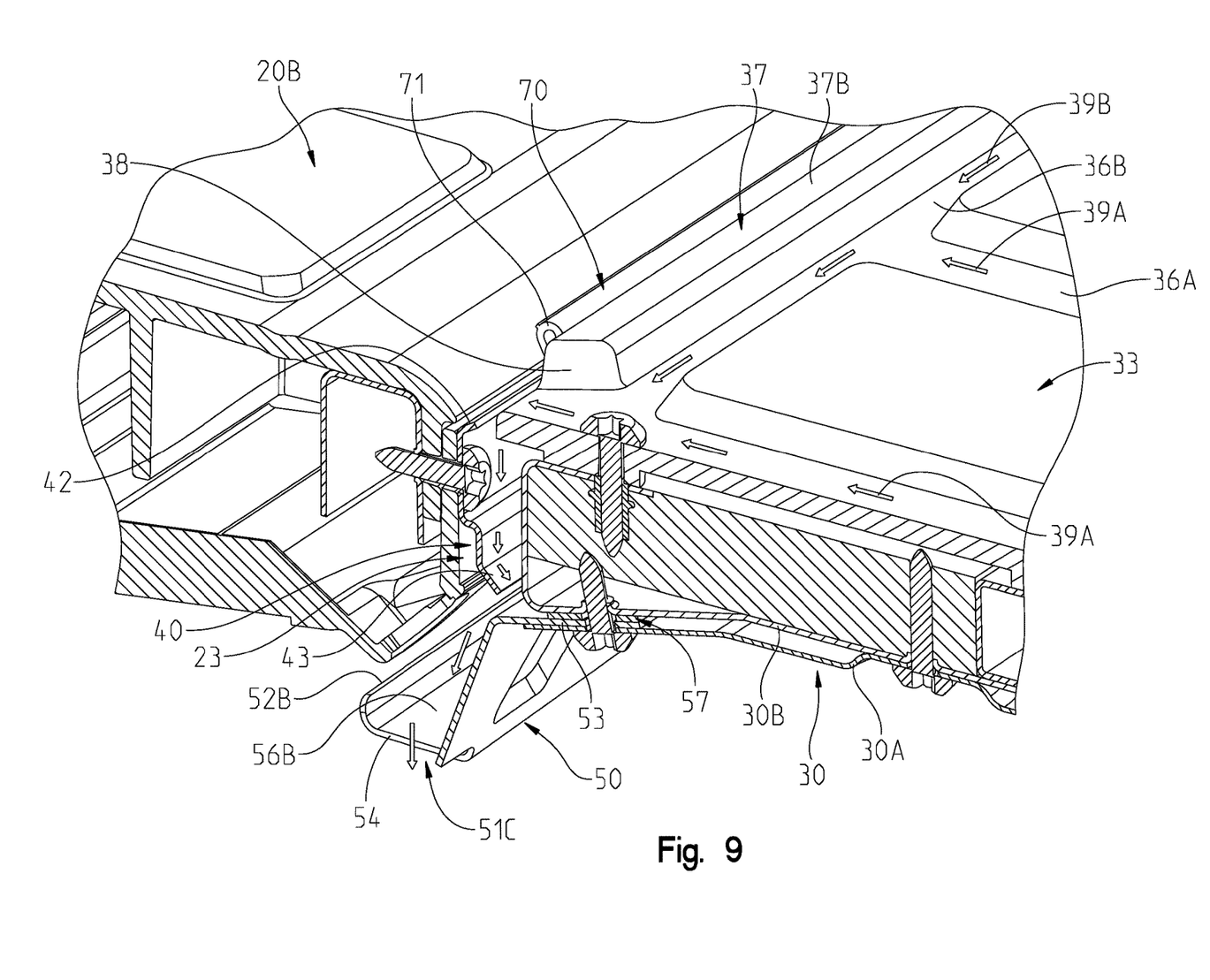
FIG. 9 is a cross-sectional view of the cargo box assembly of the vehicle of FIG. 1, taken along line 8-8 of FIG. 5 illustrating an exemplary fluid path with the tailgate in an open position.

In various embodiments, each of channels 36A and channels 36B are angled relative to a horizontal plane of vehicle 2 to direct water towards extension opening 38. That is, as illustrated in FIGS. 5 and 8-9, channels 36A are angled downwardly towards the rear of cargo box assembly 20, towards tailgate 20B. Further, channels 36B are angled downwardly towards the center of cargo box assembly 20, towards vehicle centerline 22. Cargo bed floor 33 of cargo box assembly 20 is configured to direct fluid flow through channels 36A into channels 36B, and ultimately towards a rearmost and laterally center point of cargo bed floor 33, toward extension opening 38. In various embodiments, cargo bed floor 33 is configured to direct fluid to a rearmost point of cargo bed floor 33 that is laterally offset from vehicle centerline 22.

In the present embodiment, cargo bed floor 33 is configured to direct fluid from within cargo box assembly 20 towards extension opening 38, through seal opening 71, and into drain assembly 75. Fluid that flows through extension opening 38 and seal opening 71 will be directed toward opening 54. In the event that fluid within cargo bed 20A flows over first extension portion 37A or second extension portion 37B, and in the event seal 70 is imperfect and allows fluid to flow between cargo bed 20A and tailgate 20B, fluid will flow into first trough 56A and second trough 56B, and out of drain 50 through opening 54.

Referring to FIG. 6, box bottom 30 includes a box bottom body 30B and a box bottom cover 30A. In the present embodiment, bottom cover 30A is a heat shield configured to separate and at least partially thermally insulate bottom body 30B from powertrain 25. In the present embodiment, box bottom cover 30A defines a bottom extent of cargo bed 20A. Illustratively, drain 50 is coupled between box bottom body 30B and box bottom cover 30A. A gasket 57 is positioned vertically between bottom body 30B and drain 50 to prevent fluid from flowing backward along box bottom body 30B between drain 50 and box bottom body 30B. Gasket 57 is configured to prevent fluid from flowing along box bottom body 30B between box bottom body 30B and flange 53. Illustratively, gasket 57 defines a plurality of mounting holes 57A, box bottom cover 30A defines a plurality of apertures 30C generally aligned with holes 57A, and box bottom body 30B defines a plurality of apertures 30D generally aligned with holes 57A and apertures 30C. A plurality of fasteners extend through mounting holes 57A, apertures 30C, apertures 53A, and apertures 30D to couple each of drain 50, box bottom cover 30A and gasket 57 to box bottom body 30B.

Figure 7:
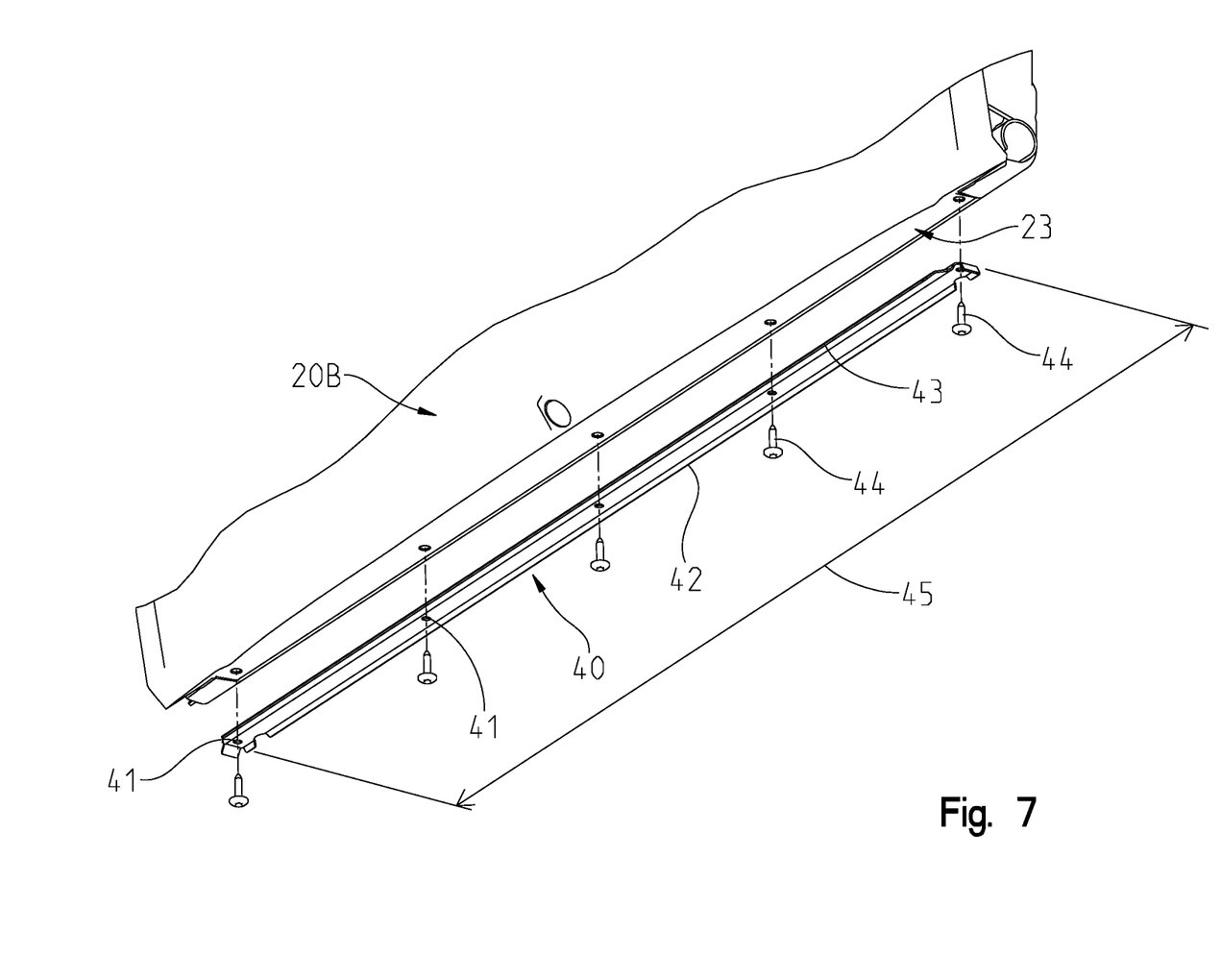
FIG. 7 is an exploded view of a wick of the drain assembly of the cargo box assembly of FIG. 3.

Referring now to FIG. 7, wick 40 is coupled to the bottom extent of tailgate 20B. Wick 40 defines a plurality of apertures 41 configured to receive a plurality of fasteners 44 to couple wick 40 to tailgate 20B. Wick 40 also includes a first extension 42 and a second extension 43. First extension 42 extends along a forward side of wick 40 and second extension 43 extends along a rearward side of wick 40. As illustrated in FIG. 8, wick 40 is positioned vertically higher than a bottom extent of drain 50. That is, wick 40 is spaced from opening 54 of drain 50. Further, wick 40 has a wick width 45 (FIG. 7) that is less than or equal to drain width 50A (FIG. 5). Each of first extension 42 and second extension 43 are configured to wick fluid toward drain 50 whether tailgate 20B is in a closed or up position or an open or down position.

Referring now to FIG. 8, the operation of cargo bed floor 33 and drain assembly 75 is provided. Fluid is configured to flow within longitudinal channels 36A and horizontal channel 36B, according to the arrows 39A, 39B which show the direction of fluid flow. Seal 70 is protected from fluid stagnation by extension 37 extending upwardly from cargo bed floor 33. Fluid is configured to flow through extension opening 38 and seal opening 71, between cargo bed floor 33 and tailgate 20B into drain assembly 75. When fluid flows into drain assembly 75, fluid is configured to flow downwardly out of drain opening 54. In the present embodiment, drain opening 54 is positioned vertically lower than box bottom 30.

As illustrated in FIG. 8, fluid may flow through extension opening 38 and seal opening 71 and contact tailgate 20B before flowing into drain 50. Fluid that flows down tailgate 20B contacts first extension 42 of wick 40 to direct fluid downwardly into drain 50. Wick 40 is configured to prevent fluid from flowing rearwardly, along a bottom edge of tailgate 20B due to the capillary effect, wherein fluid would flow further rearward and flow downwardly, outside of drain 50. First extension 42 of wick 40 ensures that fluid that flows down tailgate 20B falls into drain 50.

Still referring to FIG. 8, tailgate 20B is shown in the closed position. As previously described, when tailgate 20B is in the closed position, first extension 42 of wick 40 acts as the wicking member for fluid flowing down tailgate 20B.

Referring to FIG. 9, tailgate 20B is shown in the open position. When fluid flows through extension opening 38 and seal opening 71 when tailgate 20B is in the open position, fluid flows by a bottom extent of tailgate 20B, along wick 40. Fluid flows down wick 40 onto second extension 43, and thereby flows into drain 50.

As illustrated in FIG. 2, opening 54 is positioned vertically above cover 26A such that fluid is configured to flow onto cover 26A. Drain 50 is configured to direct the flow of fluid onto cover 26A. That is, drain 50 is configured to direct fluid toward a designated area that is thermally cooler than at least some of the surrounding areas. In various embodiments, drain 50 is configured with opening 54 positioned rearwardly of cover 26A such that drain 50 directs fluid flow downward at a position rearward of any components of powertrain 25.

Further, because wick width 45 is less than or equal to that of the width of drain width 50A, any fluid that flows onto first extension 42 of wick 40 is configured to fall into drain 50.

The following clauses illustrate example subject matter described herein.

Clause 1. A vehicle, comprising: a plurality of ground engaging members and a frame supported by the plurality of ground engaging members; a powertrain supported by the frame; a cargo bed supported by the frame, the cargo bed comprising a bed floor extending between a first wall and a second wall; and a drain coupled to a rearward portion of the cargo bed, the drain configured to direct fluid from the bed floor to a position rearward of the bed floor and away from at least a portion of the powertrain.

Clause 2. The vehicle of clause 1, further comprising a cover configured to conceal a portion of the powertrain, and the drain is configured to direct fluid toward the cover.

Clause 3. The vehicle of clause 1 or 2, wherein the cargo bed further comprises a tailgate coupled to the rearward portion of the cargo bed; and a wick extending laterally along at least a portion of a bottom extent of the tailgate, the wick positioned vertically higher than a bottom extent of the drain, wherein the wick is configured to direct fluid toward the drain.

Clause 4. The vehicle of any of clauses 1 through 3, wherein the drain is configured to extend a lateral width of the bed floor and at least a portion of the drain is sloped downwardly from a lateral outward extent toward a drain center portion.

Clause 5. The vehicle of clause 1, further comprising a tailgate coupled to a rearward portion of the cargo bed, and the cargo bed further comprising a seal positioned between the tailgate and the bed floor, the seal having a seal opening fluidly coupled to the drain.

Clause 6. The vehicle of clause 5, wherein the cargo bed further comprises a flange positioned adjacent the seal, the flange extending generally upwardly from the bed floor and having a flange opening at least partially laterally aligned with the seal opening.

Clause 7. A cargo box assembly for a utility vehicle, the cargo box assembly comprising: a bed floor comprising a bed floor, a first wall sealingly coupled to a first edge of the bed floor, and a second wall sealing coupled to a second edge of the bed floor, wherein the first edge is opposing and substantially parallel to the second edge; a tailgate extending from a third edge of the bed floor, between the first wall and the second wall; a seal positioned intermediate at least a portion of the tailgate and the bed floor, the seal defining a seal opening configured to allow fluid to pass between the bed floor and the tailgate; and a drain coupled to the cargo bed, the drain defining a drain opening positioned vertically below the seal opening and configured to direct the fluid away from a selected portion of the utility vehicle.

Clause 8. The cargo box assembly of clause 7, wherein the tailgate is configured to rotate relative to the bed floor, the cargo box assembly further comprising a wick coupled to a bottom extent of the tailgate.

Clause 9. The cargo box assembly of any of clauses 7 or 8, wherein the drain opening is positioned rearward of the bed floor.

Clause 10. The cargo box assembly of any of clauses 7 through 9, wherein the cargo box assembly has a bottom extent, and the drain opening is positioned lower than the bottom extent.

Clause 11. The cargo box assembly of any of clauses 7 through 10, wherein the drain is angled downwardly from a lateral outer extent toward the drain opening.

Clause 12. The cargo box assembly of any of clauses 7 through 11, further comprising an extension extending upwardly from the bed floor, the extension positioned adjacent the seal, and the extension defining an extension opening at least partially aligned with the seal opening.

Clause 13. A drain assembly for a cargo box assembly having a cargo bed with a cargo bed width and a tailgate coupled to a rearward portion of the cargo bed, the drain assembly comprising: a drain coupled to a rearward portion of the cargo bed, wherein the drain defines a drain opening directed generally downwardly, the drain having a drain width; a seal positioned intermediate the cargo bed and the tailgate, wherein the seal defines a seal opening fluidly coupled to the drain; and a wick coupled to a bottom of the tailgate, the wick configured to direct fluid from the tailgate toward the drain.

Clause 14. The drain assembly of clause 13, wherein the drain width is at least one-half the cargo bed width.

Clause 15. The drain assembly of any of clauses 13 or 14, wherein the seal opening is positioned vertically above the drain opening.

Clause 16. The drain assembly of any of clauses 13 through 15, wherein the wick comprises a wick width, and the wick width is less than or equal to the drain width.

Clause 17. The drain assembly of any of clauses 13 through 16, further comprising a flange positioned adjacent the seal, wherein the flange extends upwardly from the cargo bed.

Clause 18. The drain assembly of clause 17, wherein the flange comprises a flange opening, and wherein the flange opening is at least partially laterally aligned with the seal opening.

Clause 19. The drain assembly of any of clauses 13 through 18, wherein the drain is angled downwardly from a laterally outer portion to a laterally inner portion.

Clause 20. The drain assembly of any of clauses 13 through 19, wherein the drain comprises an integral flange configured to couple to a box bottom of the cargo bed.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A vehicle, comprising:
   a plurality of ground engaging members and a frame supported by the plurality of ground engaging members;
   a powertrain supported by the frame;
   a cargo bed supported by the frame, the cargo bed comprising a bed floor extending between a first wall and a second wall; and
   a drain coupled to a rearward portion of the cargo bed, the drain configured to direct fluid from the bed floor to a position rearward of the bed floor and away from at least a portion of the powertrain,
   wherein at least a portion of the drain is sloped downwardly from a lateral outward extent toward a drain center portion.

2. The vehicle of claim 1, further comprising a cover configured to conceal a portion of the powertrain, wherein the drain is configured to direct fluid toward the cover.

3. The vehicle of claim 1, wherein the cargo bed further comprises a tailgate coupled to the rearward portion of the cargo bed; and
   a wick extending laterally along at least a portion of a bottom extent of the tailgate, the wick positioned vertically higher than a bottom extent of the drain, wherein the wick is configured to direct fluid toward the drain.

4. The vehicle of claim 1, wherein the drain is configured to extend a lateral width of the bed floor.

5. The vehicle of claim 1, further comprising a tailgate coupled to the rearward portion of the cargo bed, and the cargo bed further comprising a seal positioned between the tailgate and the bed floor, the seal having a seal opening fluidly coupled to the drain.

6. The vehicle of claim 5, wherein the cargo bed further comprises a flange positioned adjacent the seal, the flange extending generally upwardly from the bed floor and having a flange opening at least partially laterally aligned with the seal opening.

7. A cargo box assembly for a utility vehicle, the cargo box assembly comprising:
   a cargo bed comprising a bed floor, a first wall sealingly coupled to a first edge of the bed floor, and a second wall sealingly coupled to a second edge of the bed floor, wherein the first edge is opposing and substantially parallel to the second edge;
   a tailgate extending from a third edge of the bed floor, between the first wall and the second wall;
   a seal positioned intermediate at least a portion of the tailgate and the bed floor, the seal defining a seal opening configured to allow fluid to pass between the bed floor and the tailgate; and
   a drain coupled to the cargo bed, the drain defining a drain opening positioned vertically below the seal opening and configured to direct the fluid away from a selected portion of the utility vehicle.

8. The cargo box assembly of claim 7, wherein the tailgate is configured to rotate relative to the bed floor, the cargo box assembly further comprising a wick coupled to a bottom extent of the tailgate.

9. The cargo box assembly of claim 7, wherein the drain opening is positioned rearward of the bed floor.

10. The cargo box assembly of claim 7, wherein the cargo box assembly has a bottom extent, and the drain opening is positioned lower than the bottom extent.

11. The cargo box assembly of claim 7, wherein the drain is angled downwardly from a lateral outer extent toward the drain opening.

12. The cargo box assembly of claim 7, further comprising an extension extending upwardly from the bed floor, the extension positioned adjacent the seal, and the extension defining an extension opening at least partially aligned with the seal opening.

13. A drain assembly for a cargo box assembly having a cargo bed with a cargo bed width and a tailgate coupled to a rearward portion of the cargo bed, the drain assembly comprising:
- a drain coupled to a rearward portion of the cargo bed, wherein the drain defines a drain opening directed generally downwardly, the drain having a drain width;
- a seal positioned intermediate the cargo bed and the tailgate, wherein the seal defines a seal opening fluidly coupled to the drain; and
- a wick coupled to a bottom of the tailgate, the wick configured to direct fluid from the tailgate toward the drain.

14. The drain assembly of claim 13, wherein the drain width is at least one-half the cargo bed width.

15. The drain assembly of claim 13, wherein the seal opening is positioned vertically above the drain opening.

16. The drain assembly of claim 13, wherein the wick comprises a wick width, and the wick width is less than or equal to the drain width.

17. The drain assembly of claim 13, further comprising a flange positioned adjacent the seal, wherein the flange extends upwardly from the cargo bed.

18. The drain assembly of claim 17, wherein the flange comprises a flange opening, and wherein the flange opening is at least partially laterally aligned with the seal opening.

19. The drain assembly of claim 13, wherein the drain is angled downwardly from a laterally outer portion to a laterally inner portion.

20. The drain assembly of claim 13, wherein the drain comprises an integral flange configured to couple the drain to a box bottom of the cargo bed.

* * * * *